H. O. BRION.
CENTER TESTING DEVICE.
APPLICATION FILED APR. 12, 1920.
1,395,087. Patented Oct. 25, 1921.
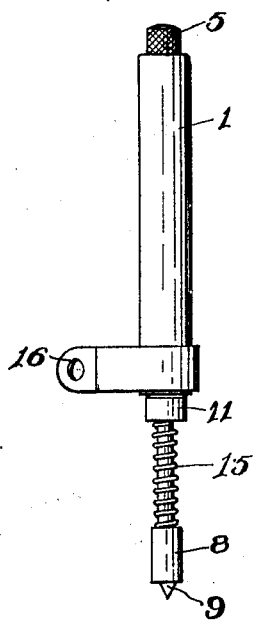
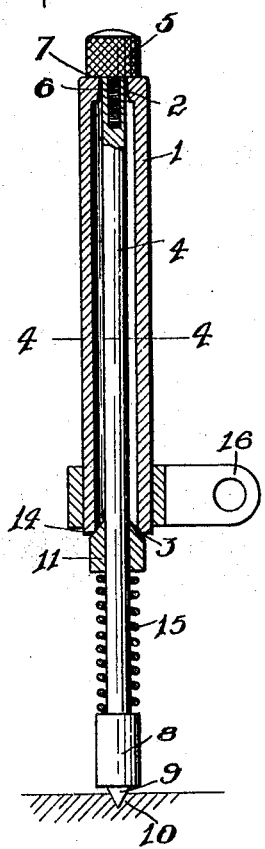
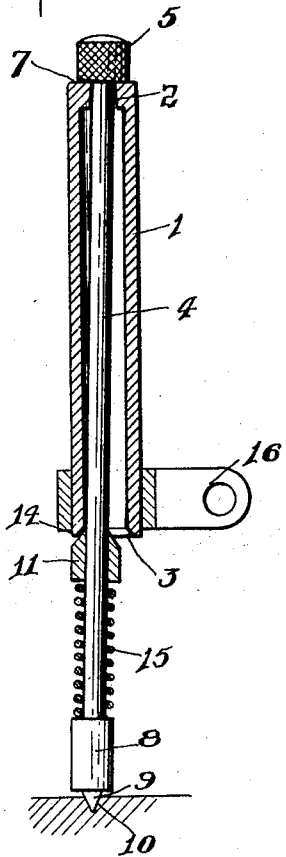
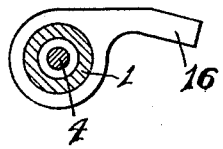
INVENTOR
Harry O. Brion
BY
Davis & Simons
his ATTORNEYS

UNITED STATES PATENT OFFICE.

HARRY O. BRION, OF ROCHESTER, NEW YORK, ASSIGNOR TO ALFRED G. CASH, OF ROCHESTER, NEW YORK.

CENTER-TESTING DEVICE.

1,395,087.  Specification of Letters Patent.  Patented Oct. 25, 1921.

Application filed April 12, 1920. Serial No. 373,103.

*To all whom it may concern:*

Be it known that I, HARRY O. BRION, a citizen of the United States, and resident of Rochester, in the county of Monroe and State of New York, have invented certain new and useful Improvements in Center-Testing Devices, of which the following is a specification.

The present invention relates to a center testing device and more particularly to the type adapted to be clamped in a suitable machine such as a lathe tail stock or the chuck of a drill press for the purpose of indicating the rotary center, an object of this invention being to provide a simple and inexpensive construction which may be used in connection with a commercial indicator for determining whether the center is out of alinement.

To this and other ends the invention consists of certain parts and combinations of parts, all of which will be hereinafter described, the novel features being pointed out in the appended claims.

In the drawings:

Figure 1 is a plan view of the center testing device;

Fig. 2 is an enlarged longitudinal section through the center testing device showing the center in alinement;

Fig. 3 is an enlarged longitudinal section showing the center out of alinement; and Fig. 4 is a section on the line 4—4, Fig. 2.

Referring more particularly to the drawings, 1 indicates the body of the device which, in this instance, is in the form of a tube having a reduced slightly tapering bore 2 at one end and at its opposite end flaring at 3. Extending through the tubular body is a stem 4 which at one end has an enlargement 5 secured thereto by a screw threaded portion 6 to form a shoulder 7 for coöperation with the adjacent end of the body. The other end of the stem projects from the body and carries an enlarged cylindrical portion 8 on which a center pointer 9 is provided. This pointer is designed for projecting into a center opening 10 in a suitable work piece.

Arranged to operate on the stem 4 is a centering device 11 in the form of a sleeve slidably mounted on the stem 4 between the cylindrical portion 8 and the body 1. This centering device preferably has a tapered portion 14 adapted to project into the flaring end 3 of the tube and to be held normally centered therein by a spring 15 preferably in the form of a helix surrounding the stem 4 between the collar 11 and the cylindrical portion 8. This spring also permits the stem 4 with the pointer 10 to yield in the direction of the longitudinal axis of the body 1 in fitting the pointer in the center opening 10. The bore 2 in the body 1 flares inwardly so as to permit the stem 4 to move or swing sidewise in any direction about the upper end as a fulcrum.

An indicating device of any known construction may be clamped to an arm 16 and may coöperate with the cylindrical portion 8 for determining the amount of displacement of the center. Assuming that the tool is held in the chuck of a drill press and the center opening 10 is on the table of the press, if the center opening 10 is out of alinement with the axis of rotation of the tool holder, then the stem 3 will be deflected laterally and the amount of this deflection will be indicated by the instrument supported on the arm 16 and coöperating with the cylindrical portion 8. In using the device on the lathe, it is clamped to the tail stock while the center opening 10 is provided on a work piece on the rotary face plate so that when the face plate revolves, the stem 4 will be displaced laterally if the opening 10 is not properly centered.

What I claim as my invention and desire to secure by Letters Patent is:

1. A center testing device comprising a body portion, a pointer, a stem on which the pointer is arranged, mounted to swing sidewise in any direction to permit the pointer to move from its centered position, and a device movable on the stem longitudinally of the latter and to one side of the point about which the stem swings, said device coöperating with the body for maintaining the pointer in its centered position.

2. A center testing device comprising a body portion, a pointer, a stem on which the pointer is arranged, mounted to swing sidewise in any direction to permit the pointer to move from its centered position, a device movable on the stem longitudinally of the latter and to one side of the point about which the stem swings, said device coöperating with the body for maintaining the pointer in its centered position, and a spring surrounding the stem and acting on said device to maintain it in coöperation with the body portion.

3. A center testing device comprising a body portion, a pointer, a stem on which the pointer is arranged, mounted to swing sidewise in any direction to permit the pointer to move from its centered position, and also mounted to move longitudinally in the body portion, and a spring pressed device movable on the stem longitudinally of the latter and to one side of the point about which the stem swings, said spring pressed device coöperating with the body portion to maintain the pointer normally in its centered position.

4. A center testing device comprising a tubular body having a reduced bore at one end, a stem extending through the body and having a shoulder coöperating with the tubular body adjacent the reduced bore, a pointer carried by said stem, a centering device slidably mounted on the stem and coöperating with the opposite end of the body portion, and a spring surrounding the stem and coöperating with the centering device to hold the latter in coöperation with the body in order to permit sidewise and longitudinal movement of the stem.

5. A center testing device comprising a body portion, a stem movable longitudinally of the body portion and also mounted to swing sidewise in any direction on the body portion, a pointer carried by the stem, and a centering device movably mounted on the stem to one side of the point about which said stem swings on the body portion, said centering device coöperating with the body portion to hold the pointer in its centered position.

6. A center testing device comprising a body portion, a stem movable longitudinally on the body portion and also mounted to swing sidewise in any direction on said body portion, a pointer carried by the stem, a cylindrical portion supported by said stem concentric with the pointer, a device movable on the stem longitudinally of the latter and to one side of the point about which the stem swings, and a helical spring arranged between said cylindrical portion and said device and acting on said device to hold it in coöperation with the body portion in order to maintain the pointer normally in a centered position.

7. A center testing device comprising a tubular body having a reduced bore at one end and tapered at its opposite end, a stem extending through the tubular body and its reduced bore and having a shoulder coöperating with the end adjacent the reduced bore, a cylindrical head at the opposite end of the stem, a pointer on said head, a centering device slidable on the stem and having a tapered portion coöperating with the tapered end of the body, and a helical spring arranged on the stem between the centering device and the cylindrical head and acting on said centering device to permit the longitudinal and sidewise movement of the stem.

8. A center testing device comprising a body, a cylindrical portion movable longitudinally and sidewise on said body, a pointer carried by said cylindrical portion, means for centering the cylindrical portion with reference to the body, and a bracket arm projecting laterally from the body for supporting an indicating device for coöperation with the cylindrical portion.

HARRY O. BRION.